(12) United States Patent
Yu et al.

(10) Patent No.: US 8,855,642 B2
(45) Date of Patent: Oct. 7, 2014

(54) NEIGHBOUR CELL LIST IN A PRIVATE NETWORK

(75) Inventors: Ling Yu, Oulu (FI); Seppo Ilmari Vesterinen, Oulunsalo (FI); Matti Einari Laitila, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 23 days.

(21) Appl. No.: 13/516,459

(22) PCT Filed: Dec. 17, 2009

(86) PCT No.: PCT/EP2009/067399
§ 371 (c)(1),
(2), (4) Date: Jun. 15, 2012

(87) PCT Pub. No.: WO2011/072741
PCT Pub. Date: Jun. 23, 2011

(65) Prior Publication Data
US 2012/0252459 A1    Oct. 4, 2012

(51) Int. Cl.
*H04W 36/00* (2009.01)
*H04W 84/04* (2009.01)
*H04W 24/02* (2009.01)
*H04W 16/12* (2009.01)

(52) U.S. Cl.
CPC ........ *H04W 36/0083* (2013.01); *H04W 84/045* (2013.01); *H04W 24/02* (2013.01); *H04W 16/12* (2013.01)
USPC ..... 455/436; 455/443; 455/435.1; 455/435.2; 455/435.3

(58) Field of Classification Search
CPC . H04W 16/12; H04W 24/02; H04W 36/0083; H04W 84/045; H04W 36/00; H04W 12/00
USPC ................. 455/436, 443, 435.1, 435.2, 435.3
See application file for complete search history.

(56) References Cited

U.S. PATENT DOCUMENTS

2010/0029283 A1*  2/2010  Iwamura ................. 455/437
2010/0061356 A1*  3/2010  Qvarfordt et al. ....... 370/338
(Continued)

FOREIGN PATENT DOCUMENTS

| EP | 2 214 434 A1 | 8/2010 |
| WO | WO 99/14974 | 3/1999 |
| WO | WO 2009/019319 A2 | 2/2009 |

(Continued)

OTHER PUBLICATIONS

3GPP TS 36.300 V8.12.0 (Mar. 2010), Technical Specification, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), (149 pages).

*Primary Examiner* — Khai M Nguyen
(74) *Attorney, Agent, or Firm* — Harrington & Smith

(57) ABSTRACT

The invention is related to an apparatus including a processor and a memory including a computer program code, the memory and the computer program code configured to, with the processor, cause the apparatus at least to: configure a private network; determine cells belonging to the private network to form a mobility priority group; store neighboring cell information on at least the cells of the private network; and convey the neighboring cell information and information on the determined mobility priority group to an authorized user device accessing the private network for providing mobility management control to a user device, the mobility management control being based on the neighboring cell information and the information on the determined mobility priority group.

17 Claims, 2 Drawing Sheets

(56) References Cited

U.S. PATENT DOCUMENTS

Figure 1:
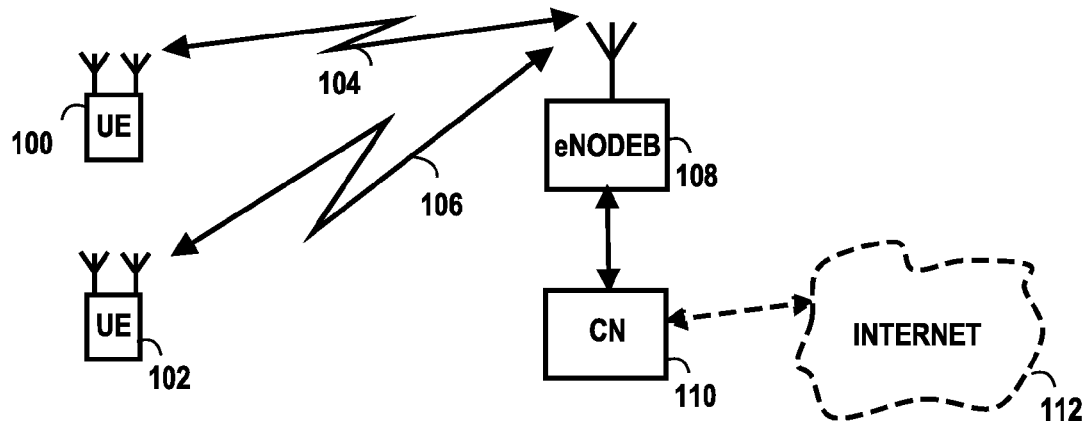

2010/0208693 A1* 8/2010 Centonza ............... 370/331
2011/0223912 A1* 9/2011 Nasielski et al. ......... 455/435.1

FOREIGN PATENT DOCUMENTS

| WO | WO 2009/022976 A1 | 2/2009 |
| WO | WO 2009022976 A1 * | 2/2009 |

* cited by examiner

NEIGHBOUR CELL LIST IN A PRIVATE NETWORK

FIELD

The invention relates to apparatuses, methods, computer programs and computer program storage media for controlling private networks.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context. Private networks, such as closed subscription group (CSG) have been introduced quite recently. The concept of CSG has been started in 3rd generation partnership project (3GPP) in release 8 and has been further developed since. A private network is only available for users that are allowed or authorized to access, such as registered subscribers or guests.

BRIEF DESCRIPTION

According to an aspect of the present invention, there is provided an apparatus comprising: a processor and a memory including a computer program code, the memory and the computer program code configured to, with the processor, cause the apparatus at least to: configure a private network; determine cells belonging to the private network to form a mobility priority group; store neighbouring cell information on at least the cells of the private network; and convey the neighbouring cell information and information on the determined mobility priority group to an authorized user device accessing the private network for providing mobility management control to a user device, the mobility management control being based on the neighbouring cell information and the information on the determined mobility priority group.

According to an aspect of the present invention, there is provided an apparatus comprising: a processor and a memory including a computer program code, the memory and the computer program code configured to, with the processor, cause the apparatus at least to: configure a private network under coverage of at least one another private network; and detect neighbouring cell information transmitted by at least one cell of the at least one another private network for an accessing device of the con-figured private network avoiding selecting a conflicting configuration with cells included in the neighbouring cell information.

According to another aspect of the present invention, there is provided a method configuring a private network; determining cells belonging to the private network to form a mobility priority group; storing neighbouring cell information on at least the cells of the private network; and conveying the neighbouring cell information and information on the determined mobility priority group to an authorized user device accessing the private network for providing mobility management control to a user device, the mobility management control being based on the neighbouring cell information and the information on the determined mobility priority group.

According to another aspect of the present invention, there is provided a method configuring a private network under coverage of at least one another private network; and detecting neighbouring cell information transmitted by at least one cell of the at least one another private network for an accessing device of the configured private network avoiding selecting a conflicting configuration with cells included in the neighbouring cell information.

According to another aspect of the present invention, there is provided an apparatus comprising: means for configuring a private network; means for determining cells belonging to the private network to form a mobility priority group; means for storing neighbouring cell information on at least the cells of the private network; and means for conveying the neighbouring cell information and information on the determined mobility priority group to an authorized user device accessing the private network for providing mobility management control to a user device, the mobility management control being based on the neighbouring cell information and the information on the determined mobility priority group.

According to another aspect of the present invention, there is provided an apparatus comprising: means for configuring a private network under coverage of at least one another private network; and means for detecting neighbouring cell information transmitted by at least one cell of the at least one another private network for an accessing device of the configured private network avoiding selecting a conflicting configuration with cells included in the neighbouring cell information.

According to another aspect of the present invention, there is provided computer program embodied on a computer readable medium, configured to control a processor to perform: configure a private network; determine cells belonging to the private network to form a mobility priority group; store neighbouring cell information on at least the cells of the private network; and convey the neighbouring cell information and information on the determined mobility priority group to an authorized user device accessing the private network for providing mobility management control to a user device, the mobility management control being based on the neighbouring cell information and the information on the determined mobility priority group.

According to another aspect of the present invention, there is provided computer program embodied on a computer readable medium, configured to control a processor to perform: configure a private network under coverage of at least one another private network; and detect neighbouring cell information transmitted by at least one cell of the at least one another private network for an accessing device of the configured private network avoiding selecting a conflicting configuration with cells included in the neighbouring cell information.

LIST OF DRAWINGS

Figure 2:
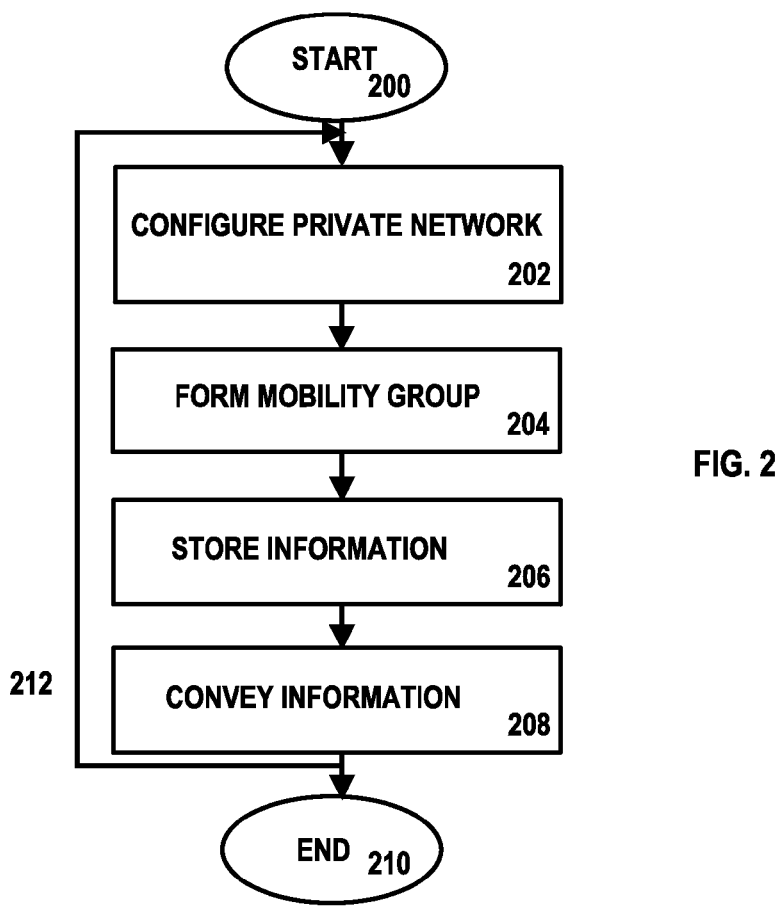
Figure 3:
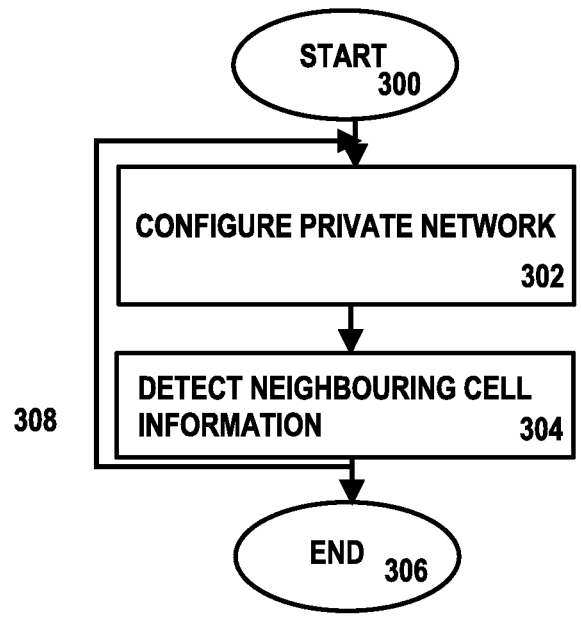
Figure 4:
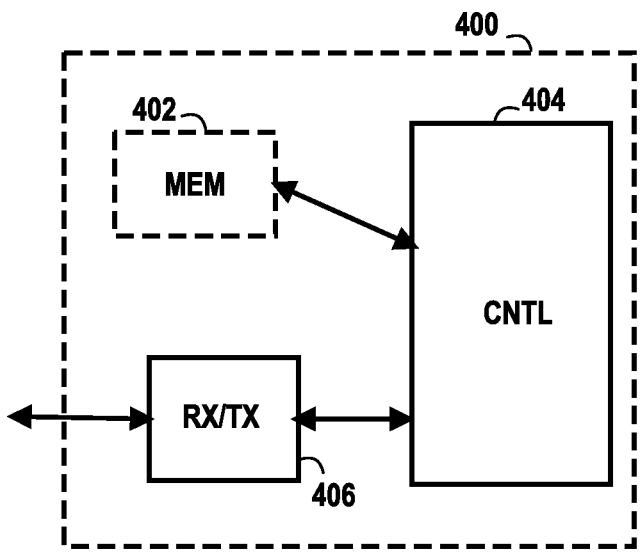

Embodiments of the present invention are described below, by way of example only, with reference to the accompanying drawings, in which FIG. 1 illustrates an example of a communication system;
FIG. 2 is a flow chart;
FIG. 3 is another flow chart; and
FIG. 4 illustrates an example of an apparatus.

DESCRIPTION OF EMBODIMENTS

The following embodiments to be described are only shown as examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The embodiments will be described with reference to the accompanying drawings, in which some, but not all embodiments of the invention are shown. Indeed, the invention may be embodied in many different forms and should not be construed as limited to the embodiments set forth herein.

Embodiments are applicable to any user device, such as a user terminal, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of an access architecture to which the embodiments may be applied, a radio access architecture based on Long term evolution (LTE) Advanced, LTE-A, that is based on OFDMA in a downlink and a single-carrier frequency-division multiple access SC-FDMA in an uplink, without restricting the embodiments to such an architecture, however.

In an Orthogonal frequency division multiplexing (OFDM) system, the available spectrum is divided into multiple orthogonal sub-carriers. In OFDM systems, available band-width is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with the necessary properties.

FIG. 1 shows a part of a radio access network of E-UTRA, LTE or LTE-A. E-UTRA (UTRA is UMTS terrestrial radio access, UMTS is Universal Mobile Telecommunications System) is an air interface of Release 8. Some advantages obtainable by LTE (or E-UTRA) are a possibility to use plug and play devices, and Frequency Division Duplex (FDD) and Time Division Duplex (TDD) in the same platform.

More precisely, FIG. 1 shows a part of a private network of which closed subscription group (CSG) is an example. The concept of CSG has been started in 3rd generation partnership project (3GPP) in release 8 and has been further developed since. A private network is only available for user devices (also called user equipment, UE, user terminal, etc.) that are allowed or authorized to access (registered subscribers or guests). However, mobility in private networks including a plurality of cells still needs consideration. Solution for providing inter-cell intra-CSG mobility management is required especially in enterprise, campus or like network scenarios.

FIG. 1 shows user devices 100 and 102 configured to be in a wireless connection on one or more communication channels 104, 106 in a cell with a Home eNodeB (HeNodeB, HeNB) 108 providing the cell. The physical link from a user device to a HeNodeB is called uplink or reverse link and the physical link from the HeNodeB to the user device is called downlink or forward link.

A NodeB, advanced evolved node B (eNodeB) as well as HNodeB (h denotes home), HeNodeB or HeNB, is a computing device configured to control the radio resources of communication system it is coupled to. The NodeB may also be referred to a base station, an access point or any other type of interfacing device including a relay station capable of operating in a wireless environment.

The NodeB includes transceivers, for instance. From the transceivers of the NodeB, a connection is provided to an antenna unit that establishes bi-directional radio links to the user devices.

A H(e)NB typically incorporates the capabilities of a standard Node B as well as the radio resource management functions of a standard radio network controller (RNC). Depending on the system, the counterpart on the core network (CN) 110 side can be a serving gateway S-GW (routing and forwarding user data packets), packet data network gateway (PDN GW, P-GW) for providing connectivity to user devices (UEs) to external packet data networks, or mobile management entity (MME), etc. The core network may be called evolved packet core (EPC). In networks supporting home (e)NodeBs, a home (e)NodeB gateway may also be provided.

A H(e)NB may further be coupled to a NodeB of a macrocell under which the private network may be configured. Home networks for LTE-systems are specified in 3GPP TS 36.300 on stage 2 level.

The communication system may also be able to communicate with other networks, such as a public switched telephone network or the Internet 112.

The user device illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards a NodeB.

The user device refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

The user device (or a layer 3 relay node) is configured to perform one or more of user equipment functionalities described below with an embodiment, and it may be configured to perform functionalities from different embodiments. The user device may also be called a subscriber unit, mobile station, remote terminal, access terminal, user terminal or user equipment (UE) just to mention but a few names or apparatuses.

It should be understood that, in the FIG. 1, user devices are depicted to include two antennas and the NodeBs are depicted to have only one antenna for the sake of clarity. The number of reception and/or transmission antennas may naturally vary according to a current implementation. The LTE and LTE-A systems utilize various multiple input-multiple output (MIMO) technologies including transmit diversity, single user (SU)-MIMO, multi-user (MU)-MIMO, closed-loop precoding, and dedicated beamforming.

It is obvious for a person skilled in the art that the depicted system is only an example of a part of a radio access system and in practise, the system may comprise a plurality of HNodeBs, the user device may have an access to a plurality of radio cells and the system may comprise also other apparatuses, such as physical layer relay nodes or other network elements, etc.

Further, although the apparatuses have been depicted as single entities, different units, processors and/or memory units (not all shown in FIG. 1) may be implemented.

As to mobility management in private networks, due to the high number of closed subscription group cells within the coverage of macro-layer cells and the nature of the H(e)NB deployment, it is not practical to list all the neighbouring private network (or CSG) cells in macro-layer cell system information or dedicated measurement control message to assist a user device for cell searching or detecting. Therefore, there has been discussion about autonomous private network cell searching based on a fingerprint. However, the autonomous private cell searching typically requires higher battery consumption in order to provide shorter private network inbound handover time perceived by an end user. Another option is to allow longer private network inbound time to avoid impact on battery consumption.

Further, if cells belonging to more than one mutually uncoordinated private network exist, a configuration conflict or confusion may take place, since the network and/or user devices are not able to uniquely identify cells, if more than one cell uses the same cell identification, such as a physical cell identification (PCI) or physical scrambling code (PSC). The configuration conflict in this context means that in the same radio coverage area, two cells use the same cell identification. In this context, term "configuration confusion" means that a cell has two or more neighbouring cells using the same cell identification.

In the following, an embodiment of a method for private network configuration to facilitate mobility management within the private network is explained in further detail in relation to FIG. 2. The embodiment is especially well-suited for enterprises, such as offices, shopping centres, malls, campuses, etc. The embodiment starts in block 200.

In block 202, a private network is configured.

Examples of private networks are enterprise networks and home networks. Typically, in an enterprise network, an operator creates a network plan which enables the network to be configured in a coordinated way. In home networks, instead, Home NodeB:s may be deployed in an un-coordinated way to create a private network by using autoconfiguration procedures.

In block 204, cells belonging to the private network are determined to form a mobility priority group.

For providing mobility, a network typically maintains a neighbouring cell list including usually measurement information on radio cells which are in the proximity of the cell of interest. If multiple neighbouring CSG cells serve one CSG, each CSG cell of the CSG cell cluster (that is the private network in question) may indicate to user devices which of the cells in a neighbouring cell list belong to the same CSG cell cluster. The neighbouring cell info may include the same information as specified in UTRAN or E-UTRAN for cell information relating to neighbouring cells, such as physical cell identification (PCI), physical scrambling code (PSC) and/or Qoffset.

The information may be broadcasted as a part of a system information block (SIB) to all user devices in the cell and/or sent to a given user device via a dedicated measurement control message.

The neighbouring cell information of the CSG cells in the cluster may be captured at a coordinated deployment phase or by using self-configuration features such as an automatic neighbour relation (ANR) function.

A mobility priority group typically comprises the neighbouring cells which belong to the same CSG cell cluster. The mobility priority group may be indicated in the neighbouring cell list by giving a range of cell identifications, such as physical cell identifications, of the CSG cells of the cluster.

The network being able to support CSG outbound mobility fulfilling the same performance requirements than mobility as usual, information on neighbouring macro-layer cells may also be included into the neighbouring cell list. In such a case, the neighbouring cell list information in system information and/or a dedicated measurement control message may indicate to a user device which of the cells are macro-layer cells and which ones are CSG cluster cells. Further, also information on neighbouring cells of a different private network (another CSG cluster) may be included in the neighbouring cell information but separately indicated to a user device that they are such cells.

The neighbouring cell information may also include different cell selection/reselection parameters, such as Qoffset, and/or a mobility measurement configuration, such as a measurement reporting configuration, for neighbouring CSG cells of the cluster. The same information on other neighbouring cells, that is a macro-layer cell under which the CSG cell cluster may be located and/or CSG cells of other CSG cell clusters, may also be included. This is especially useful in providing mobility also for a user device which is in an idle mode.

The cell selection/reselection parameters may be set differently for a mobility priority group than for other cells. The cell selection/reselection measurements are made periodically and they may trigger cell selection/reselection procedure based on cell selection/reselection parameters. The different setting may for example include one or more thresholds according to the desired priority.

In block 206, neighbouring cell information on at least the cells of the private network are stored in a memory. The memory in this context indicates different kinds of data storages.

In block 208, the neighbouring cell information and information on the determined mobility priority group are conveyed to an authorized user device accessing the private network for providing mobility management control to a user device, the mobility management control being based on the neighbouring cell information and the information on the determined mobility priority group.

Typically, this provides a possibility to control a user device from the perspective of mobility management that is, for instance, directing the user device to measure and/or select a (handover) target cell first in the mobility group.

With the neighbouring cell information (typically in the form of a neighbouring cell list) of the same CSG cell cluster, Home (e)NodeB or Home eNodeB gateway may uniquely identify a handover target CSG cell based on PCI/PSC information report from a user device and the current serving CSG cell. Therefore, the user device does not have to report E-UTRAN Cell Global Identifier (ECG) to assist the network to identify a handover target cell. Based on the neighbouring CSG cell information indicated by the network, the user device may detect PCI/PSC for being informed that the measured cell belongs to the same CSG cluster (is an intra-CSG cell). Thus the device does not have to continue reading system information block (SIB) for acquiring further information such as E-UTRAN Cell Global Identifier (ECGI) or tracking area identification (TAI) as normally for CSG inbound mobility measurement report. Additionally, when the user device moves within the coverage area of the CSG cell cluster, the user device which is allowed to access (for example having a membership) has the information on the neighbouring CSG cells of the same CSG it can have access to. The information is based on a mobility priority group. The user device does not have to read system information block (SIB) of the neighbouring CSG cells of the same cluster in order to get the CSG identification (ID) for a preliminary access control.

The embodiment ends in block 210. The embodiment may be repeated in many different ways. Arrow 212 shows one example.

In the following, an embodiment for avoiding cell identification conflict and/or confusion is explained referring to FIG. 3. The embodiment starts in block 300.

In block 302 a private network is configured under coverage of at least one another private network.

Within the coverage of a CSG cell cluster (private network), another CSG cell may be deployed uncoordinatedly. A typical situation is that under the coverage of a private network, is established an independent private network, such as a home network.

If the other CSG cell can select a PCI/PSC only based on detected PCI/PSC of the CSG cells in the neighbourhood, the newly deployed CSG cell may cause a PCI/PSC confusion problem to a neighbouring CSG cell cluster. In such a case, a handover source cell or a Home (e)NodeB gateway is not able to unambiguously identify the target CGS cell only based on a reported PCI/PSC.

In block 304, neighbouring cell information transmitted by at least one cell of the at least one another private network is detected for an accessing device of the configured private network avoiding selecting a conflicting configuration with cells included in the neighbouring cell information.

When a new Home (e)NodeB is accessing the environment, it scans radio signals for being able to receive system information on existing cells in the neighbourhood.

For avoiding a conflicting configuration between the new Home (e)NodeB and the existing cells (for example, cell identification conflict or confusion) the newly deployed private network may read neighbouring cell list of all the detected CSG cells and avoid selecting any cell identification, such as a PCI/PSC that is listed in the neighbouring cell list of the detected CSG cells.

The embodiment ends in block 306. The embodiment may be repeated in many ways. Arrow 308 shows one example. The steps/points, signaling messages and related functions described above in FIGS. 2 and 3 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. Signaling messages are only exemplary and may even comprise several separate messages for transmitting the same information. In addition, the messages may also contain other information.

FIG. 4 is a block diagram of an apparatus according to an embodiment of the invention. Although the apparatus has been depicted as one entity, different modules and memory may be implemented in one or more physical or logical entities. The apparatus may be any node or a host, such as Home (e) NodeB, server or a web stick or another kind of device providing means for providing network services. It is obvious for a person skilled in the art that the apparatus may include also other parts than those depicted in FIG. 4.

The apparatus 400 comprises a processor 404 and a memory 402 including a computer program code, the memory and the computer program code configured to, with the processor, cause the apparatus at least to configure a private network, determine cells belonging to the private network to form a mobility priority group, store neighbouring cell information on at least the cells of the private network, and convey the neighbouring cell information and information on the determined mobility priority group to an authorized user device accessing the private network for the user device selecting a target cell first in the mobility group. The apparatus may further comprise or be operably coupled to radio transceiver 406 for communication in a radio network, such as a private network.

Another example of an apparatus 400 comprises a configurer 404 configured to configure a private network, a determinator 404 configured to determine cells belonging to the private network to form a mobility priority group, a memory 402 configured to store neighbouring cell information on at least the cells of the private network, and a conveyor unit 404 configured to convey the neighbouring cell information and information on the determined mobility priority group to an authorized user device accessing the private network for the user device selecting a target cell first in the mobility group. The apparatus may further comprise or be operably coupled to radio transceiver 406 for communication in a radio network, such as a private network.

Yet another example of an apparatus 400 comprises means 404 for configuring a private network, means 404 for determining cells belonging to the private network to form a mobility priority group, means 402 for storing neighbouring cell information on at least the cells of the private network and means 404 for conveying the neighbouring cell information and information on the determined mobility priority group to an authorized user device accessing the private network for the user device selecting a target cell first in the mobility group. The apparatus may further comprise or be operably coupled to means for transceiving 406 for communication in a radio network, such as a private network.

The functionality of the apparatus is described in more detail above in relation to FIG. 2.

FIG. 4 also depicts another embodiment of the apparatus. Although the apparatus has been depicted as one entity, different modules and memory may be implemented in one or more physical or logical entities. The apparatus may be any node or a host, such as Home (e) NodeB, server or a web stick or another kind of device providing means for providing network services. It is obvious for a person skilled in the art that the apparatus may include also other parts than those depicted in FIG. 4.

The apparatus 400 comprises a processor 404 and a memory 402 including a computer program code, the memory and the computer program code configured to, with the processor, cause the apparatus at least to configure a private network under coverage of at least one another private network, and detect neighbouring cell information transmitted by at least one cell of the at least one another private network for an accessing device of the configured private network avoiding selecting a conflicting configuration with cells included in the neighbouring cell information. The apparatus may further comprise or be operably coupled to radio transceiver 406 for communication in a radio network, such as a private network.

Another example of an apparatus 400 comprises a configures 404 configured to configure a private network under coverage of at least one another private network, and a detector configured to detect neighbouring cell information transmitted by at least one cell of the at least one another private network for an accessing device of the configured private network avoiding selecting a conflicting configuration with cells included in the neighbouring cell information. The apparatus may further comprise or be operably coupled to radio transceiver 406 for communication in a radio network, such as a private network.

Yet another example of an apparatus 400 comprises means 404 for configuring a private network under coverage of at least one another private network, and means 404 for detecting neighbouring cell information transmitted by at least one cell of the at least one another private network for an accessing device of the configured private network avoiding selecting a conflicting configuration with cells included in the neighbouring cell information. The apparatus may further comprise or be operably coupled to means for transceiving 406 for communication in a radio network, such as a private network.

The functionality of the apparatus is described in more detail above in relation to FIG. 3.

The apparatus 400 may be implemented as an electronic digital computer or a microprocessor (such as a single-chip computer element), which may comprise a detachably connected working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The apparatus 400 may be a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

An embodiment provides a computer program embodied on a distribution medium, comprising program instructions which, when loaded into an electronic apparatus, constitute the apparatus as explained above.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor; and
   at least one memory including computer program code, the at least one memory and the computer program code configured, with the at least one processor, to cause the apparatus to perform the following:
   configure a private network, said private network being of cells available only to user devices having authorized access thereto;
   determine cells belonging to the private network to form a mobility priority group, said mobile priority group comprising neighbouring cells of the private network;
   store neighbouring cell information on at least the cells of the private network; and
   convey the neighbouring cell information and information on the determined mobility priority group to an authorized user device accessing the private network for providing mobility management control to a user device, the mobility management control being based on the neighbouring cell information and the information on the determined mobility priority group.

2. The apparatus of claim 1, wherein the private network is a cluster of closed subscriber group cells.

3. The apparatus of claim 1, wherein the mobility priority group comprises neighbouring cells belonging to the same private network.

4. The apparatus of claim 1, wherein the at least one memory and the computer program code are further configured, with the at least one processor, to indicate the mobility priority group to the user device in the neighbouring cell information by giving a range of cell identifications of the cells of the private network.

5. The apparatus of claim 1, wherein information on neighbouring cells of a different private network and/or macro-layer cells is included separately in the neighbouring cell information.

6. The apparatus of claim 1, wherein the neighbouring cell information includes cell selection/reselection parameters, and/or a mobility measurement configuration, such as a measurement reporting configuration for neighbouring cells of the private network, macro-layer cells and/or neighbouring cells of another private network.

7. The apparatus of claim 1, the apparatus comprising an (e)NodeB or home (e)NodeB.

8. A method comprising:
configuring a private network, said private network being of cells available only to user devices having authorized access thereto;
determining cells belonging to the private network to form a mobility priority group, said mobile priority group comprising neighbouring cells of the private network;
storing neighbouring cell information on at least the cells of the private network; and
conveying the neighbouring cell information and information on the determined mobility priority group to an authorized user device accessing the private network for providing mobility management control to a user device, the mobility management control being based on the neighbouring cell information and the information on the determined mobility priority group.

9. The method of claim 8, wherein the private network is a cluster of closed subscriber group cells.

10. The method of claim 8, wherein the mobility priority group comprises neighbouring cells belonging to the same private network.

11. The method of claim 8, further comprising:
indicating the mobility priority group to the user device in the neighbouring cell information by giving a range of cell identifications of the cells of the private network.

12. The method of claim 8, wherein information on neighbouring cells of a different private network and/or macro-layer cells is included separately in the neighbouring cell information.

13. The method of claim 8, wherein the neighbouring cell information includes cell selection/reselection parameters, and/or a mobility measurement configuration, such as a measurement reporting configuration for neighbouring cells of the private network, macro-layer cells and/or neighbouring cells of another private network.

14. An apparatus comprising:
means for configuring a private network, said private network being of cells available only to user devices having authorized access thereto;
means for determining cells belonging to the private network to form a mobility priority group, said mobile priority group comprising neighbouring cells of the private network;
means for storing neighbouring cell information on at least the cells of the private network; and
means for conveying the neighbouring cell information and information on the determined mobility priority group to an authorized user device accessing the private network for pro-viding mobility management control to a user device, the mobility management control being based on the neighbouring cell information and the information on the determined mobility priority group.

15. A computer program product comprising a non-transitory computer readable storage medium bearing computer program code embodied therein for use with a computer, the computer program code comprising code to perform:
configure a private network, said private network being of cells available only to user devices having authorized access thereto;
determine cells belonging to the private network to form a mobility priority group, said mobile priority group comprising neighbouring cells of the private network;
store neighbouring cell information on at least the cells of the private network; and
convey the neighbouring cell information and information on the determined mobility priority group to an authorized user device accessing the private network for providing mobility management control to a user device, the mobility management control being based on the neighbouring cell information and the information on the determined mobility priority group.

16. The computer program product of claim 15, wherein the private network is a cluster of closed subscriber group cells.

17. The computer program product of claim 15, wherein the mobility priority group comprises neighbouring cells belonging to the same private network.

* * * * *